United States Patent
Parashar et al.

(10) Patent No.: US 12,493,729 B2
(45) Date of Patent: Dec. 9, 2025

(54) STIMULI-INDEPENDENT CLOCK GATING DETERMINATION

(71) Applicant: TEXAS INSTRUMENTS INCORPORATED, Dallas, TX (US)

(72) Inventors: Abhinav Parashar, Delhi (IN); Harish Maruthiyodan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 647 days.

(21) Appl. No.: 17/853,490

(22) Filed: Jun. 29, 2022

(65) Prior Publication Data

US 2023/0110425 A1 Apr. 13, 2023

(30) Foreign Application Priority Data

Sep. 28, 2021 (IN) ............................. 202141043922

(51) Int. Cl.
| | | |
|---|---|---|
| *G06F 30/33* | (2020.01) | |
| *G06F 30/3323* | (2020.01) | |
| *G06F 30/367* | (2020.01) | |
| *G06F 30/396* | (2020.01) | |
| *G06F 30/398* | (2020.01) | |
| *G06F 117/04* | (2020.01) | |

(52) U.S. Cl.
CPC ............ *G06F 30/33* (2020.01); *G06F 30/396* (2020.01); *G06F 30/3323* (2020.01); *G06F 30/367* (2020.01); *G06F 30/398* (2020.01); *G06F 2117/04* (2020.01)

(58) Field of Classification Search
CPC .... G06F 30/33; G06F 30/3323; G06F 30/367; G06F 30/396; G06F 30/398; G06F 2117/04

USPC ..... 716/106, 111, 114, 134, 136; 703/14, 19
See application file for complete search history.

(56) References Cited

U.S. PATENT DOCUMENTS

| | | | | |
|---|---|---|---|---|
| 6,604,227 B1 * | 8/2003 | Foltin | ................. | G06F 30/3312 716/108 |
| 7,676,778 B2 * | 3/2010 | Arbel | .................... | G06F 30/327 716/134 |
| 8,434,047 B1 * | 4/2013 | Jiang | ..................... | G06F 30/396 716/132 |
| 9,003,339 B2 * | 4/2015 | Jensen | .................. | G06F 30/327 716/108 |

(Continued)

FOREIGN PATENT DOCUMENTS

WO WO-2009024540 A2 * 2/2009 ........... G06F 1/3203

OTHER PUBLICATIONS

Dai et al., "Sequential Equivalent Checking of Clocked-Gated Circuits", ACM, 2015, 6 pages. (Year: 2015).*

(Continued)

*Primary Examiner* — Phallaka Kik
(74) *Attorney, Agent, or Firm* — Xianghui Huang; Frank D. Cimino

(57) ABSTRACT

A method includes receiving a circuit design, identifying sequential elements and corresponding clocks in the circuit design, and identifying sequential elements that are not clock gated in the circuit design by running a first formal verification process on the circuit design. The method further includes modifying the circuit design to add clock gating for at least one sequential element that was identified as not being clock gated to generate a first modified circuit design.

17 Claims, 3 Drawing Sheets

(56) References Cited

U.S. PATENT DOCUMENTS

| | | | | |
|---|---|---|---|---|
| 9,934,342 B1* | 4/2018 | Huang | ............... | G06F 30/327 |
| 10,650,112 B1* | 5/2020 | Krishnamurthy | ...... | H03K 3/037 |
| 10,740,515 B1* | 8/2020 | Kaur | ............... | G06F 30/333 |
| 2004/0225978 A1* | 11/2004 | Fan | ............... | G06F 30/30 |
| | | | | 716/103 |
| 2005/0097491 A1* | 5/2005 | Katayose | ............... | G06F 30/30 |
| | | | | 716/114 |
| 2006/0129961 A1* | 6/2006 | Paul | ............... | G06F 30/30 |
| | | | | 716/108 |
| 2007/0226664 A1* | 9/2007 | Gemmeke | ............... | G06F 30/3323 |
| | | | | 716/108 |
| 2008/0263488 A1* | 10/2008 | Banerji | ............... | G06F 30/396 |
| | | | | 327/261 |
| 2008/0288901 A1* | 11/2008 | Barowski | ............... | G06F 30/3323 |
| | | | | 716/108 |
| 2008/0301593 A1* | 12/2008 | Jiang | ............... | G06F 30/396 |
| | | | | 716/132 |
| 2008/0301594 A1* | 12/2008 | Jiang | ............... | G06F 30/396 |
| | | | | 716/132 |
| 2009/0013289 A1* | 1/2009 | Arbel | ............... | G06F 30/327 |
| | | | | 716/134 |
| 2009/0115488 A1* | 5/2009 | Cortadella | ............... | G06F 30/327 |
| | | | | 327/365 |
| 2010/0049481 A1* | 2/2010 | Walker | ............... | G06F 1/10 |
| | | | | 703/2 |
| 2010/0325596 A1* | 12/2010 | Arbel | ............... | G06F 30/39 |
| | | | | 716/108 |
| 2012/0159416 A1* | 6/2012 | Jiang | ............... | G06F 30/3312 |
| | | | | 716/113 |
| 2014/0258948 A1* | 9/2014 | Jensen | ............... | G06F 30/327 |
| | | | | 716/104 |
| 2014/0282350 A1* | 9/2014 | Chang | ............... | G06F 30/396 |
| | | | | 716/136 |
| 2020/0073433 A1* | 3/2020 | Aune | ............... | G06F 30/3308 |

OTHER PUBLICATIONS

Vittal et al., "Using sequential equivalence to verify clock-gating strategies", https://www.techdesignforums.com/practice/technique/using-sequential-equivalence-to-verify-clock-gating-strategies/, Nov. 6, 2017, 3 pages. (Year: 2017).*

* cited by examiner

STIMULI-INDEPENDENT CLOCK GATING DETERMINATION

CROSS-REFERENCE TO RELATED APPLICATIONS

This application claims priority to India Provisional Application No. 202141043922, filed Sep. 28, 2021, titled "Formal Based methodology for Stimuli Independent Clock Gating Completeness," which is hereby incorporated by reference in its entirety.

BACKGROUND

Integrated circuits (ICs) typically include combinatorial logic (e.g., logic gates) and sequential elements such as flip-flops. A flip-flop has a clock input which receives a clock signal. A flip-flop consumes power upon receipt of a clock edge (e.g., rising edge) which causes the flip-flop to change state. ICs typically include numerous sequential elements, some of which may not be used at all times during operation of the IC. Clock gating may be implemented in the IC to gate off the clock signal to one or more sequential elements when such sequential elements are not in use. Gating off a clock to a sequential element prevents the sequential element from changing states and thereby reduces the power consumption of the sequential element.

One technique to determine where in a circuit clock gating can be employed includes performing simulations in which stimulus input signals are provided to the non-clock gated circuit design to identify portions of the circuit that are not operated during the specific stimulus and thus identifying a portion of the clock distribution network that can be gated. This process may involve multiple iterations, each iteration with a different input stimulus, to identify opportunities for clock gating. A drawback of this approach is that identifying scenarios for which portions of the circuit can be clock-gated depends on the sufficiency of the stimuli used during the simulations. Scenarios in which clock-gating could be employed for specific input signals may be missed because such specific input stimulus signals were not tested.

SUMMARY

In one example, a method includes receiving a circuit design, identifying sequential elements and corresponding clocks in the circuit design, and identifying sequential elements that are not clocked in the circuit design by running a first formal verification process on the circuit design. The method further includes modifying the circuit design to add clock gating for at least one sequential element that was identified as not being clock gated to generate a first modified circuit design.

In another embodiment, a non-transitory computer-readable medium contains software that, when executed by a processor, causes the processor to receive a circuit design, identify sequential elements and corresponding clocks in the circuit design, and identify sequential elements that are not clocked in the circuit design by running a first formal verification process having at least one assertion property on the circuit design.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

As described herein, a computer system analyzes a design for an electronic device (e.g., an integrated circuit) to identify clock inputs to sequential elements (e.g., flip-flops) that can be clock gated to save power. In one embodiment, the computer system executes a formal verification software tool that includes the functionality described herein. Formal verification refers to one or more techniques that use static analysis based on mathematical transformations to determine the correctness of hardware or software behavior. Formal verification is in contrast to dynamic verification techniques such as simulation. In addition to the clock gating analysis described herein, the formal verification software tool may perform one or more other functions such as determining whether the circuit will function as intended. Based on the results of the formal verification software tool's clock gating analysis, the design can be modified to include circuitry (e.g., AND gates) to implement clock gating. The formal verification software tool also may identify data signal within combinatorial logic that can be gated off to save power as well.

Figure 1:
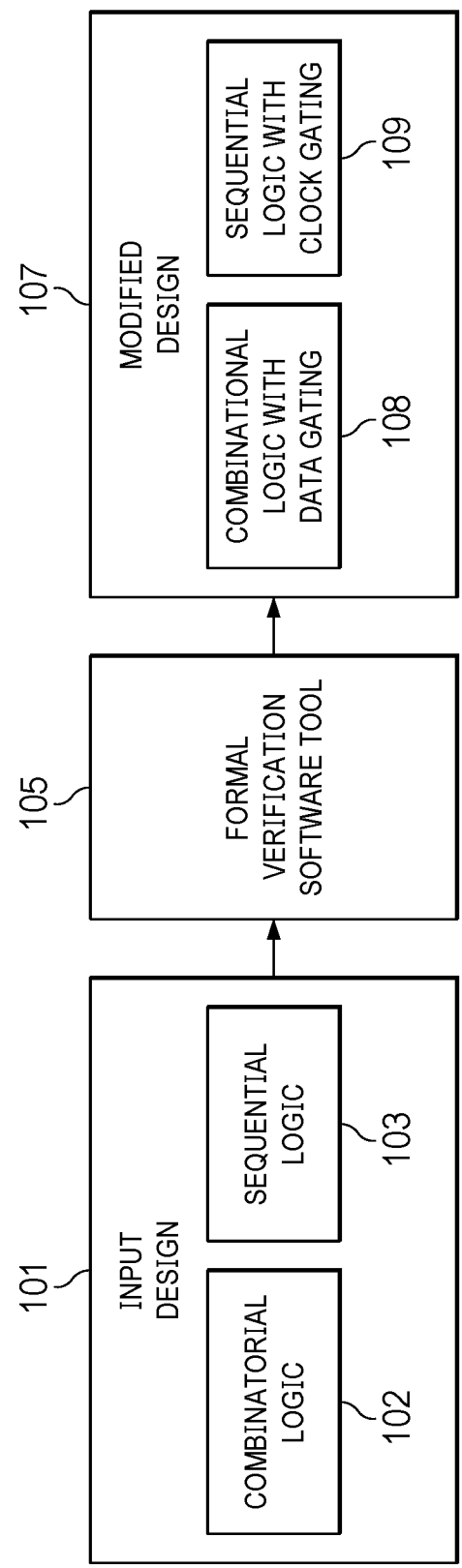
FIG. 1 is a block diagram illustrating a formal verification tool usable to modify an input design to include clock and data gating in accordance with an example.

FIG. 1 illustrates a formal verification software tool 105 which receives and analyzes an input design 101 to produce a modified design 107. The formal verification software tool 105 is executable on a computer system (e.g., a server computer, personal computer, etc.). The input design 101 represents a schematic of, for example, an integrated circuit (IC). The input design 101 may have been created in a computer-aided design system or other type of circuit creation software tool. The input design may include combinatorial logic 102 (e.g., logic gates) and sequential logic 103 (e.g., sequential elements such as flip-flops), and the modified design includes combinational logic 108 with data gating and sequential logic 109 with clock gating. The sequential elements (e.g., data (D) flip-flops, set(S)-reset (R) flip-flops, etc.) within the sequential logic 103 have clock inputs configured to receive clock signals to advance the state of the respective sequential element.

The input design 101 may have one or more modes of operation. For example, the input design 101 may have configuration and control registers that can be written to or read from during a register read-write mode of operation. One or more sequential elements may be included in the input design 101 to provide the read-write capability of such registers. The input design 101 may have the ability to generate interrupts and other sequential elements may be included in the design to enable the generation of such interrupts. An external interface such as a universal asynchronous receiver-transmitter (UART) may be included in the design, and yet other sequential elements may be included to operate the UART during a mode of operation in which the UART is used.

During active use of a given mode of operation, the sequential elements dedicated for use during another mode (which is idle) of operation may not perform any useful operations. However, clock gating for the sequential elements for such idle modes operation may not have been implemented as part of the input design 101. In some embodiments, some, but not full, clock-gating may have been implemented, meaning that the clock inputs to some sequential elements associated with the idled mode of operation have been gated off, while the clocks to other sequential element clock inputs for such idled modes remain active. Sequential elements that receive active clock signals consume power but if the mode of operation in which such sequential elements are used is in an idle state, such power consumption is wasted.

Accordingly, the input design 101 may not have implemented any clock gating or may have implemented relatively little clock gating. In either case, opportunities exist within the input design for the inclusion of additional circuitry to gate off the clocks to at least some sequential elements when such sequential elements are not needed (e.g., the mode of operation for which such sequential elements are useful is in a non-operational/idle state). As described herein, the formal verification software 105 processes the input design 101 and identifies clock signal coupled to inputs of sequential elements that can be gated off during certain modes of operation. The formal verification software 105 does not require stimuli to identify clock gating opportunities as otherwise may be the case as described above.

Figure 2:
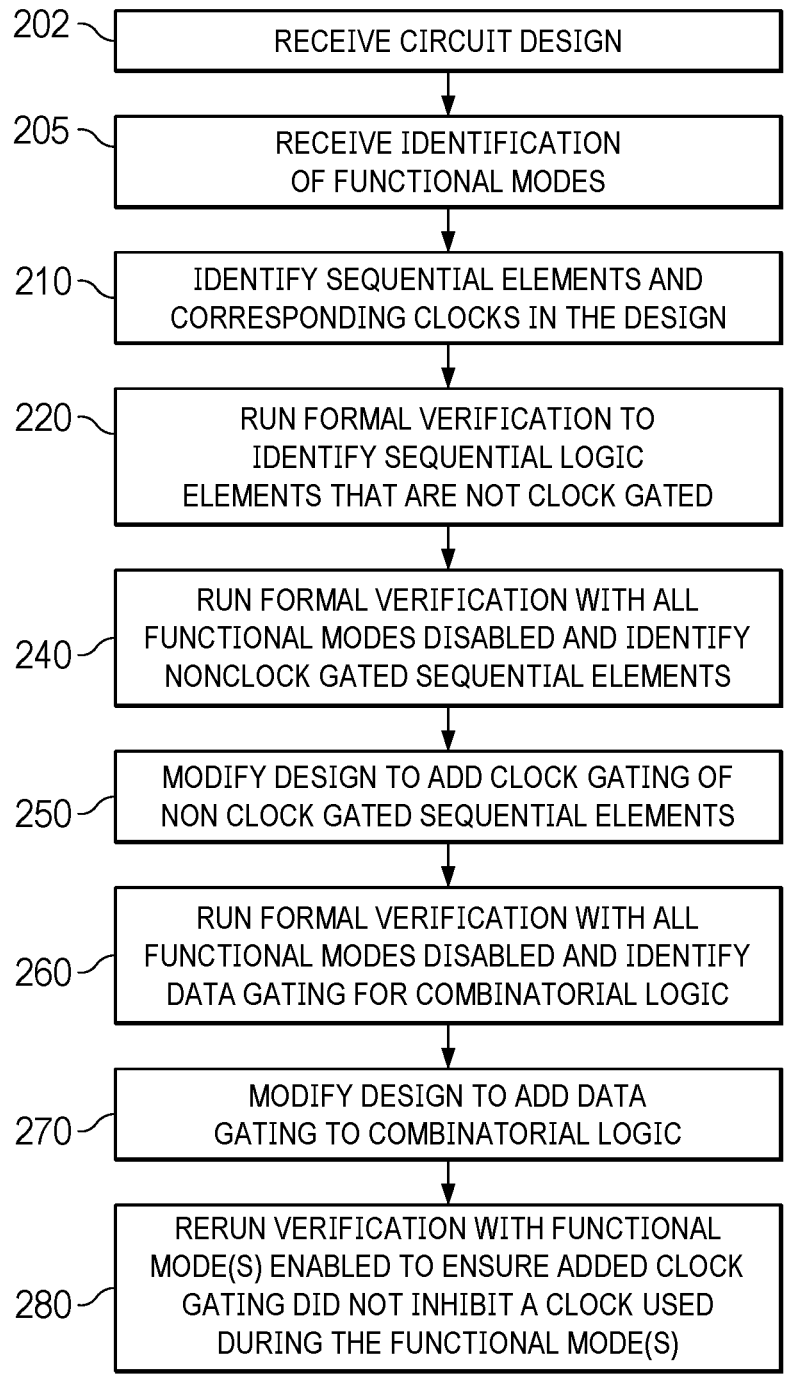
FIG. 2 is a flowchart illustrating a method for identifying clock signal inputs to sequential elements that can be clock gated and identifying data signals that can be data gated, in accordance with an example.

FIG. 2 illustrates a method that is implemented by the formal verification software tool 105 in accordance with one embodiment. At step 202, the method includes receiving the circuit design. For example, the input design received may include both combinatorial logic and sequential logic. The input design may or may not have any clock gating already implemented as part of the design. The input design may be represented in a file which is retrieved from memory or over a network interface by a computer system that executes the formal verification software tool 105. The file may identify the components of the design (AND gates, OR gates, flip-flops, registers, etc.) and the signals within the design. For example, the file may identify the specific sequential elements and the clocks that are provided to the clock inputs of such sequential elements.

At step 205, the method includes receiving identifying information for all of the modes of operation of the input design. Such input may be provided to the computer system executing the formal verification software tool by way of, for example, a keyboard, mouse, another input file, etc. For each mode of operation, the information provided specifies which inputs to the design are used for the respective mode and how those inputs are to be used to render active the mode. For example, for a register read/write mode of operation, the information may include which input(s) are to be asserted to effectuate a read operation or a write operation.

At step 210, the method includes identifying the sequential elements within the input design and their corresponding clocks. In one embodiment, this step is performed by the formal verification software tool 105 parsing or otherwise analyzing the file containing the input design to create a list of the sequential elements and their corresponding clocks. Each sequential element is candidate for the implementation of clock gating for its input clock. The input design may or may not have already implemented clock gating for any given sequential element.

At step 220, the method includes running a formal verification process on the input design to identify those sequential elements that are not currently clock gated in the design. The formal verification process performed in step 220 may include providing a clock on the input of the clock input of the design and causing the clock to run continuously during verification process. The formal verification software tool 105 may include one or more Verilog assertion properties that are evaluated during the verification process. The argument of an assertion property is a condition, the truth of which is tested during the formal verification process. In this case, the condition is that the clock input to a given sequential element is "stable." The stable statement in Verilog code means that each time the particular clock input is tested during the verification process, the logic level of the clock input is the same (e.g., always logic high or always logic low).

If the stable assertion property for a given sequential element clock input evaluates to a "true" result, then that particular clock input did not toggle between logic levels and thus was gated off via circuitry already present in the input design. If the assertion property for a given sequential element clock input evaluates to a "false" result, then that particular clock input did toggle between logic levels during the formal verification process. This false result is an indication that that particular sequential element clock input is not gated off and thus the input design can be modified to include clock gating for that sequential element. A separate assertion property can be created for each sequential element clock input to thereby separately test each such clock input.

In one embodiment, the frequency with which the stable assertion property is tested is higher than the intended input clock frequency to the design. In one example, the frequency with which the stable assertion property is tested is 16 times higher than the input clock frequency to the design. By sampling the sequential elements' clock inputs at a faster rate than the frequency of the input clocks to the sequential elements themselves, the formal verification software tool 105 ensures an accurate assessment of the sequential element clocks.

The result of the verification process performed in step 220 includes a pass/fail results of the stable assertion properties described above. Those stable assertion properties that evaluate to pass (or true) means that those particular sequential element clock inputs were clock gated. Those stable assertion properties that evaluate to fail (or false) means that those particular sequential element clock inputs were not clock gated. The formal verification software tool 105 may create a list of those sequential element clock inputs that are currently not clock gated and thus are candidates for possible clock gating.

At step 240, the method includes executing another formal verification process on the input design, this time with all of the functional modes disabled that were identified in step 205. Disabling a functional mode means configuring the circuit for the formal verification process without that particular functional mode being active. In the case of a register read/write operational mode, the configuration includes neither reading nor writing the registers. In an example where a mode is triggered by one or more inputs, the respective input(s) may be constrained to prevent entering the respective mode. With all functional modes disabled, clock inputs to sequential elements should not change logic state if clock gating implemented. This second formal verification process is executed with stable assertion properties as described above for those sequential elements already determined not have clock gating implemented on the clock inputs. For any sequential element whose clock input has not been clock gated, the stable assertion property for that clock input will evaluate to fail (false). For any sequential element whose clock input has been clock gated, the stable assertion property for that clock input will evaluate to pass (true).

The result of step 240 may be that the formal verification software tool 105 outputs a list identifying those sequential elements for which clock gating should be added based on the stable assertion property of the respective clock input evaluating to fail. The output may be in the form of a file, displayed information, etc. At step 250, the method includes modifying the design to add clock gating for those sequential element clock inputs that were determined not to already have clock gating. This step may be performed by a design engineer using the output from the formal verification software tool 105 listing those sequential elements whose clock inputs should be clock gated. The modification may be performed by the design engineer using, for example, the computer-aided design tool used to create the original design. Each clock gating implementation may include, for example, an AND gate in which one input is the clock signal to be gated and another input is a control signal which is asserted to logic 0 to gate off the clock signal when the functional mode applicable for the sequential element is not active.

In addition to gating of clock signals, the formal verification software tool 105 also may determine opportunities for data gating to further save power. Data gating may be added for one or more signal nodes within the circuit design. The design may include a signal chain from one or more inputs to one or more outputs that includes the combinatorial logic 102 and not any of the sequential logic 103. Because such signal chains do not include clock gated sequential logic, one or more of the logic gates in such signal chains may receive a logic signal that changes state when all of the functional modes are disabled for the IC.

At step 260, the method includes again running (executing) a formal verification process on the design in which all of the functional modes are disabled. Because, per step 250, the design has been modified to fully gate the clocks for the sequential logic when all functional modes are disabled, there should be no logic state transitions within the combinatorial logic during this formal verification process. Any such logic state transitions are unnecessary (the design is in the idle/disabled mode). Stable assertion properties again can be used to monitor the signaling within the combinatorial logic to detect any signals that change state during the formal verification process. If any signals are detected that change logic state when the design is in the idle mode, the formal verification software tool 105 outputs a report to the design engineer to indicate that data gating should be implemented for the combinatorial logic associated with a changing logic state. The data gating (e.g., an AND gate) can be implemented per step 270 on, for example, the inputs to the combinatorial logic. Step 270 may be performed by a design engineer using a computer-aided design tool. Then, in block 280, formal verification is rerun with one or more functional modes or combinations of functional modes active to ensure that the added clock gating did not inhibit a clock used during the functional mode(s).

Figure 3:
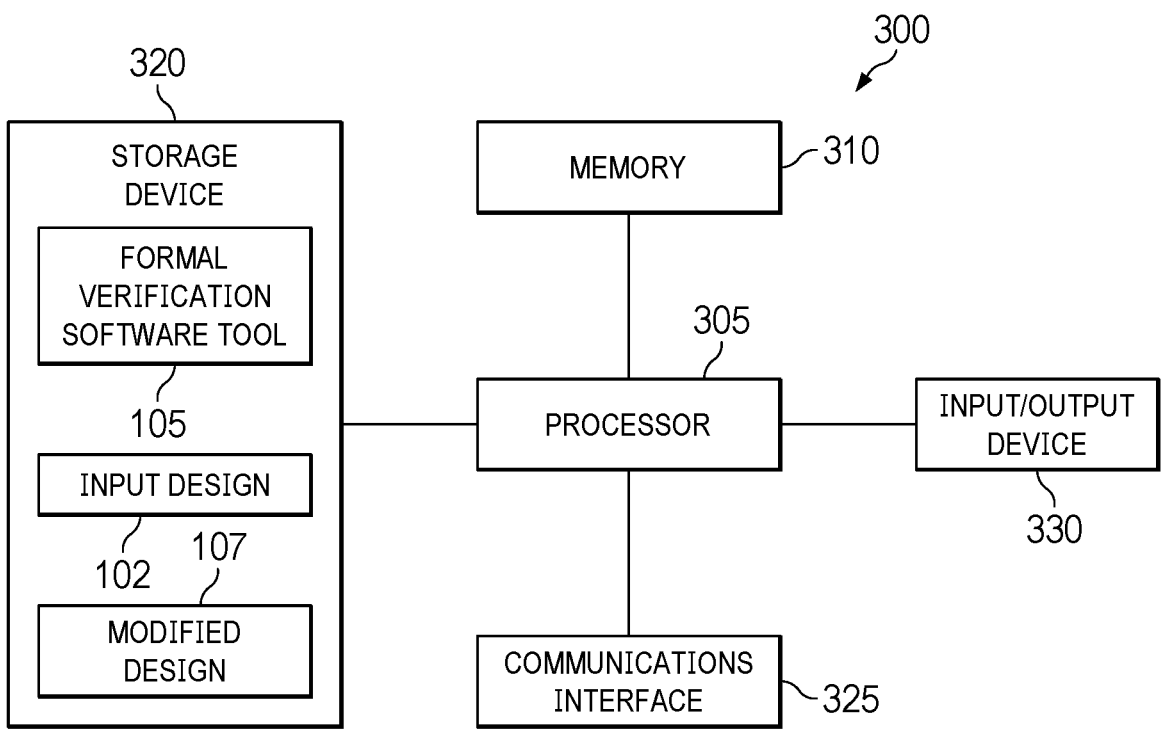
FIG. 3 is a block diagram of a computer system including formal verification software capable of analyzing a circuit to identify where clock and data gating can be included in a circuit design, in accordance with an example.

FIG. 3 is a block diagram of a computer system that a processing resource such as processor 305, memory 310, non-volatile storage device 320, a communications interface 325, and an input/output device 330. The computer system 300 may be, for example, a server computer. Although one processor 305 is shown, the computer system 300 may include multiple processors 305. Examples of processors include, but are not limited to, a central processing unit (CPU), image processor, a microprocessor, digital signal processor (DSP), etc. The memory 310 may be a non-transitory computer readable storage medium configured to store various types of data and/or software. For example, the memory 310 may include one or more volatile devices such as random-access memory (RAM), registers, etc. The input/output devices 330 may include one or more of a variety of input devices such as human input devices (e.g., mouse, keyboard, touchscreen, etc.) one or more output devices (e.g., display monitors).

Non-volatile storage devices 320 may include one or more disk drives, optical drives, solid-state drives (SSDs), tape drives, flash memory, electrically erasable programmable read-only memory (EEPROM), and/or any other type of storage design capable of retaining data and/or software for a duration time after a power loss or shut down operation. The non-volatile storage devices 320 may also be used, for example, to store software that is loaded into the memory 310 when such software is executed by processor 305. Such software may include the formal verification software 105 described herein. Upon execution of the formal verification software 105, the processor 305 performs one or more of the operations described herein. The input design 101 may be stored and retrieved from the storage device 320 for analysis by the formal verification software 105. In another embodiment, the input design may be retrieved over a network through the communication interface 325 for analysis by the formal verification software 105. The communication interface may include be a wired interface (e.g., Ethernet) and/or wireless interface (e.g., WiFi).

Software (such as the formal verification software 105) may be developed, encoded, and compiled in a variety of computing languages for a variety of software platforms and/or operating systems and subsequently loaded and executed by the processor 305. In one embodiment, the compiling process of the software program may transform program code written in a programming language to another computer language such that the processor 305 is able to execute the instructions. For example, the compiling process of the software program may generate an executable program that provides encoded instructions (e.g., machine code instructions) for processor 305 to accomplish specific, non-generic, particular computing functions.

After the compiling process, the encoded instructions may then be loaded as computer executable instructions or process steps to the processor 305 from the storage device 320, from the memory 310, and/or embedded within the processor 305 (e.g., via a cache or on-board memory). The processor 305 may be configured to execute the stored instructions or process steps to perform instructions or process steps to transform the computer system 300 into a non-generic, particular, specially programmed machine or apparatus. Stored data (e.g., data stored by the storage device 320) may be accessed by the processor 305 during the execution of computer executable instructions or process steps to instruct one or more components within the computer system 300. The storage device 320 may be partitioned or split into multiple sections that may be accessed by different software programs. For example, the storage device 320 may include a section designated for specific purposes, such as storing program instructions or data for updating software of the computer system 300.

In some cases, the computer system 300 may include multiple operating systems. For example, the computer system 300 may include a general-purpose operating system which is utilized for normal operations. The computer system 300 may also include an additional operating system, such as a bootloader, for performing specific tasks, such as upgrading and recovering the general-purpose operating system and allowing access to the computer system 300 at a level generally not available through the general-purpose operating system. Both the general-purpose operating system and another operating system may have access to the section of the storage device 320 designated for specific purposes.

In the description, certain specific details are set forth to provide a thorough understanding of various disclosed implementations and embodiments. However, other implementations and embodiments may be practiced without one or more of these specific details, or with other methods, components, or materials.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method, comprising:
   receiving a circuit design;
   identifying sequential elements and corresponding clocks in the circuit design;
   identifying at least one of the sequential elements that is not clock gated in the circuit design by running a first formal verification process on the circuit design; and
   modifying the circuit design to add clock gating for the at least one sequential element that was identified as not being clock gated to generate a first modified circuit design.

2. The method of claim 1, wherein the circuit design has at least one functional mode, and the method further comprises, after identifying the sequential elements, running a formal verification process on the circuit design with the at least one functional mode disabled.

3. The method of claim 1, further comprising identifying signal nodes within the first modified circuit design for data gating by running a second formal verification process on the first modified circuit design.

4. The method of claim 3, further comprising modifying the first modified circuit design to add data gating to at least one of the identified signal nodes.

5. The method of claim 1, wherein identifying the sequential elements and their corresponding clocks includes parsing a file containing the received circuit design and creating a list of the sequential elements and their corresponding clocks.

6. A non-transitory computer-readable medium containing software that, when executed by a processor, causes the processor to:
   receive a circuit design;
   identify sequential elements and corresponding clocks in the circuit design; and
   identify at least one of the sequential elements that is not clock gated in the circuit design by running a first formal verification process having at least one assertion property on the circuit design.

7. The non-transitory computer-readable medium of claim 6, wherein the circuit design has at least one functional mode, and wherein, when executed, the software further causes the processor to, after identifying the sequential elements, run a formal verification process on the circuit design with the at least one functional mode disabled.

8. The non-transitory computer-readable medium of claim 6, wherein, when executed, the software further causes the processor to identify the sequential elements and their corresponding clocks by parsing a file containing the received circuit design and creating a list of the sequential elements and their corresponding clocks.

9. The non-transitory computer-readable medium of claim 6, wherein, when executed, the software further causes the processor to modify the circuit design to add clock gating for the at least one sequential element that was identified as not being clock gated to generate a modified version of the circuit design.

10. The non-transitory computer-readable medium of claim 9, wherein, when executed, the software further causes the processor to identify signal nodes within the modified version of the circuit design for data gating by running a second formal verification process on the modified version of the circuit design.

11. The non-transitory computer-readable medium of claim 8, wherein, when executed, the software further causes the processor to modify the modified version of the circuit design to add data gating to at least one of the identified signal nodes.

12. A system, comprising:
   memory configured to store software; and
   a processor configured to execute the software to:
      receive a circuit design;
      identify sequential elements and corresponding clocks in the circuit design; and
      identify at least one of the sequential elements that is not clock gated in the circuit design by running a first formal verification process having at least one assertion property on the circuit design.

13. The system of claim 12, wherein the circuit design has at least one functional mode, and wherein the processor is further configured to execute the software to after identifying the sequential elements, perform a formal verification process on the circuit design with the at least one functional mode disabled.

14. The system of claim 12, wherein the processor is further configured to execute the software to modify the circuit design to add clock gating for the at least one sequential element that was identified as not being clock gated to generate a modified circuit design.

15. The system of claim 14, wherein the processor is further configured to execute the software to identify signal nodes within the modified circuit design for data gating by running a second formal verification process on the modified circuit design.

16. The system of claim 15, wherein the processor is further configured to execute the software to modify the modified circuit design to add data gating to at least one of the identified signal nodes.

17. The system of claim 12, wherein the processor is further configured to execute the software to identify the sequential elements and their corresponding clocks by parsing a file including the received circuit design and creating a list of the sequential elements and their corresponding clocks.

\* \* \* \* \*